(12) United States Patent
Takamura et al.

(10) Patent No.: US 10,655,478 B2
(45) Date of Patent: May 19, 2020

(54) TURBINE BLADE AND GAS TURBINE

(71) Applicant: Mitsubishi Hitachi Power Systems, Ltd., Kanagawa (JP)

(72) Inventors: Keita Takamura, Yokohama (JP); Satoshi Hada, Yokohama (JP); Hidekatsu Atsumi, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 170 days.

(21) Appl. No.: 15/569,247

(22) PCT Filed: Aug. 8, 2016

(86) PCT No.: PCT/JP2016/073284
§ 371 (c)(1),
(2) Date: Oct. 25, 2017

(87) PCT Pub. No.: WO2017/033726
PCT Pub. Date: Mar. 2, 2017

(65) Prior Publication Data
US 2018/0128116 A1 May 10, 2018

(30) Foreign Application Priority Data
Aug. 25, 2015 (JP) .................. 2015-165539

(51) Int. Cl.
*F01D 5/18* (2006.01)
*F02C 7/18* (2006.01)
*F01D 5/22* (2006.01)

(52) U.S. Cl.
CPC ............. *F01D 5/189* (2013.01); *F01D 5/225* (2013.01); *F02C 7/18* (2013.01)

(58) Field of Classification Search
CPC ............. F02C 7/18; F01D 5/225; F01D 5/189
See application file for complete search history.

(56) References Cited

U.S. PATENT DOCUMENTS 5,472,316 A * 12/1995 Taslim .................. F01D 5/187
416/96 R
5,482,435 A    1/1996 Dorris et al.
(Continued)

FOREIGN PATENT DOCUMENTS

CN    1162346     10/1997
CN    101627182    1/2010
(Continued)

OTHER PUBLICATIONS

International Search Report dated Sep. 6, 2016 in corresponding International Application No. PCT/JP2016/073284.
(Continued)

*Primary Examiner* — Sizo B Vilakazi
(74) *Attorney, Agent, or Firm* — Wenderoth, Lind & Ponack, L.L.P.

(57) ABSTRACT

A blade main body (51) of a gas turbine is provided with a first cooling passage part (58), a second cooling passage part (59), a column part (60), and a plurality of protrusions. The first cooling passage part (58) is provided at the side near to a leading edge (55). The second cooling passage part (59) is provided at the side near to a trailing edge (56). The column part (60) is provided between the first cooling passage part (58) and the second cooling passage part (59), and is continuously formed between a base part and an end part of the blade main body (51). The protrusions protrude from the inner wall surfaces of the first cooling passage part (58) and the second cooling passage part (59).

18 Claims, 8 Drawing Sheets

(56) References Cited

U.S. PATENT DOCUMENTS

| | | | | |
|---|---|---|---|---|
| 7,137,780 | B2* | 11/2006 | Liang | F01D 5/187 416/90 R |
| 7,377,747 | B2* | 5/2008 | Lee | F01D 5/188 416/96 R |
| 8,167,560 | B2* | 5/2012 | Liang | F01D 5/187 416/97 R |
| 2002/0119045 | A1 | 8/2002 | Starkweather | |
| 2002/0119047 | A1* | 8/2002 | Starkweather | F01D 5/187 416/97 R |
| 2003/0133798 | A1* | 7/2003 | Dailey | F01D 5/187 416/97 R |
| 2006/0002795 | A1* | 1/2006 | Liang | F01D 5/187 416/97 R |
| 2009/0035128 | A1* | 2/2009 | Ahmad | F01D 5/187 415/177 |
| 2010/0247290 | A1 | 9/2010 | Hada et al. | |
| 2011/0008177 | A1 | 1/2011 | McFeat et al. | |
| 2016/0326884 | A1* | 11/2016 | Lewis | F01D 11/24 |

FOREIGN PATENT DOCUMENTS

| | | |
|---|---|---|
| JP | 8-200002 | 8/1996 |
| JP | 9-53407 | 2/1997 |
| JP | 10-212903 | 8/1998 |
| JP | 11-500507 | 1/1999 |
| JP | 2006-242050 | 9/2006 |
| JP | 2009-517574 | 4/2009 |
| JP | 2009-167934 | 7/2009 |
| JP | 2010-281316 | 12/2010 |
| JP | 5489597 | 5/2014 |
| WO | 2010/109954 | 9/2010 |

OTHER PUBLICATIONS

Written Opinion of the International Searching Authority dated Sep. 6, 2016 in corresponding International Application No. PCT/JP2016/073284.

* cited by examiner

TURBINE BLADE AND GAS TURBINE

TECHNICAL FIELD

The present invention relates to a turbine blade and a gas turbine.

This application claims priority based on JP 2015-165539 filed in Japan on Aug. 25, 2015, of which the contents are incorporated herein by reference.

BACKGROUND ART

Turbine blades of a gas turbine are exposed to a high-temperature, high-pressure working fluid and thus have internal cooling structures. Specifically, the turbine blades each have, for example, a flow channel inside as a cooling structure, and compressed air extracted from a compressor flows in the flow channel as cooling air, thereby internally cooling the turbine blade. A turbine blade on the front stage side of the gas turbine and a turbine blade on the rear stage side have mutually different lengths and the like, and the working fluid flows around these turbine blades at mutually different temperatures. Thus, these turbine blades have mutually different cooling conditions. This means that the internal cooling flow channels are required to have different structures between the turbine blades on the front stage side and the rear stage side.

Patent Document 1 discloses an example of the cooling structure on the rear stage side. Specifically, in a turbine blade disclosed in Patent Document 1, a cavity in which pin fins project from the inner wall is provided inside a hub and a blade root, and multi-holes that communicate with the cavity and an opening formed in a blade tip and through which cooling air passes from the cavity to the opening are formed inside the blade on the blade tip side with respect to the hub.

CITATION LIST

Patent Document

Patent Document 1: JP 09-53407 A

SUMMARY OF INVENTION

Technical Problems

In the turbine blade disclosed in Patent Document 1, the cooling air flows in the multi-holes to cool the blade tip side. Securing the necessary heat transfer rate by the multi-holes requires increasing the flow velocity of the cooling air being a cooling medium flowing in these multi-holes, resulting in an increase in pressure loss. Thus, the cooling air is required to be supplied at a high supply pressure on the blade root side being the upstream side. If the cooling air is supplied at a high supply pressure, a leakage flow increases on the blade root side, resulting in an increase in the amount of the cooling air supplied. As described above, cooling air being a cooling medium in a gas turbine blade is generated by being extracted from a compressor, for example. Such air extracted from the compressor is used for cooling the turbine blade without being used for rotating the turbine. This means that the amount of the cooling medium used for the turbine blade is required to be minimized to enhance performance of the gas turbine.

An object of the present invention is to provide a turbine blade capable of effective cooling with a minimum amount of a cooling medium supplied, and a gas turbine.

Solution to Problems

According to a first aspect of the present invention, a turbine blade includes a leading edge and a trailing edge. The turbine blade includes a blade main body including a pressure surface and a suction surface disposed between the leading edge and the trailing edge. The blade main body includes a first cooling passage part, a second cooling passage part, a column part, and a plurality of protrusions. The first cooling passage part is disposed near the leading edge, and a cooling medium flows through the first cooling passage part. The second cooling passage part is disposed near the trailing edge, and the cooling medium flows through the second cooling passage part. The column part is disposed between the first cooling passage part and the second cooling passage part and is continuously formed between a base part and an end part of the blade main body. The protrusions protrude from an inner wall surface of the first cooling passage part and an inner wall surface of the second cooling passage part.

The cooling medium flows through the first cooling passage part having the inner wall surface on which the protrusions are formed, so that the side closer to the leading edge of the blade main body can be cooled efficiently. Similarly, the cooling medium flows through the second cooling passage part having the inner wall surface on which the protrusions are formed, so that the side closer to the trailing edge of the blade main body can be cooled. In this way, especially the leading edge side and the trailing edge side, which readily reach high temperature, can be effectively cooled with the first cooling passage part and the second cooling passage part, and the column part is disposed in a portion relatively difficult to reach high temperature between the leading edge side and the trailing edge side. This configuration can reduce the cross-sectional area of the entire cooling passage. The above-described structure of the cooling passage including the protrusions can ensure a certain cross-sectional area and yield cooling effect in comparison with conventional structures having multi-holes. This structure can minimize pressure loss when the cooling medium flows through the cooling passage and reduce the supply pressure. Thus, the amount of the supplied cooling medium required for cooling the turbine blade can be minimized.

According to a second aspect of the present invention, the first cooling passage part of the turbine blade according to the first aspect may include a plurality of cooling passages between the column part and the leading edge. The cooling passages may include a leading edge side cooling passage and a first intermediate cooling passage. The leading edge side cooling passage extends in a blade height direction, is arranged along a mean line, and is arranged closest to the leading edge. The first intermediate cooling passage is arranged closer to the column part than the leading edge side cooling passage is and has a flow channel cross-sectional area larger than that of the leading edge side cooling passage.

With this configuration, if the cooling medium is supplied to the leading edge side cooling passage and the first intermediate cooling passage, the flow velocity of the cooling medium flowing through the leading edge side cooling passage can be increased relatively. Thus, cooling performance can be enhanced in a portion closer to the leading edge. This results in effective cooling on the leading edge side provided with the leading edge side cooling passage, which readily reaches high temperature relative to a portion provided with the first intermediate cooling passage.

According to a third aspect of the present invention, the second cooling passage part of the turbine blade according to the first or second aspect may include a plurality of cooling passages between the column part and the trailing edge. The cooling passages may include a trailing edge side cooling passage and a second intermediate cooling passage. The trailing edge side cooling passage extends in the blade height direction, is arranged along the mean line, and is arranged closest to the trailing edge. The second intermediate cooling passage is arranged closer to the column part than the trailing edge side cooling passage is and has a flow channel cross-sectional area larger than that of the trailing edge side cooling passage.

With this configuration, if the cooling medium is supplied to the trailing edge side cooling passage and the second intermediate cooling passage, the flow velocity of the cooling medium flowing through the trailing edge side cooling passage can be increased relatively. Thus, cooling performance can be enhanced in a portion closer to the trailing edge. This results in effective cooling on the trailing edge side provided with the trailing edge side cooling passage, which readily reaches high temperature relative to a portion provided with the second intermediate cooling passage.

According to a fourth aspect of the present invention, the protrusions of the turbine blade according to the second or third aspect may include first protrusions and second protrusions smaller than the first protrusions. The first protrusions may be disposed in at least one of the first intermediate cooling passage and the second intermediate cooling passage. The second protrusions may be disposed in at least one of the leading edge side cooling passage and the trailing edge side cooling passage.

This configuration can reduce the pressure loss of the cooling medium flowing through the leading edge side cooling passage and the trailing edge side cooling passage in comparison with that of the cooling medium flowing through the first intermediate cooling passage and the second intermediate cooling passage. Thus, the flow velocity of the cooling medium flowing through the first intermediate cooling passage and the second intermediate cooling passage can be reduced relative to the flow velocity of the cooling medium flowing through the leading edge side cooling passage and the trailing edge side cooling passage. This results in effective cooling on the leading edge side and the trailing edge side, and can reduce the entire amount of the cooling medium supplied by reducing the amount of the cooling medium flowing through the first intermediate cooling passage and the second intermediate cooling passage.

According to a fifth aspect of the present invention, the turbine blade according to the first aspect may further include a tip shroud disposed at a blade tip of the blade main body. The first cooling passage part may include a plurality of cooling passages extending in a blade height direction between the column part and the leading edge and arranged along a mean line. The second cooling passage part may include a plurality of cooling passages extending in the blade height direction between the column part and the trailing edge and arranged along the mean line. The tip shroud may include a first discharge passage, a second discharge passage, and a third discharge passage. The first discharge passage discharges the cooling medium flowing through a leading edge side cooling passage arranged closest to the leading edge among the cooling passages of the first cooling passage part. The second discharge passage discharges the cooling medium flowing through a trailing edge side cooling passage arranged closest to the trailing edge among the cooling passages of the second cooling passage part. The third discharge passage discharges the cooling medium flowing through an intermediate cooling passage disposed between the leading edge side cooling passage and the trailing edge side cooling passage.

With this configuration, if the turbine blade includes the tip shroud, the cooling medium flowing through the leading edge side cooling passage from the base part to the blade tip of the blade main body can be discharged through the first discharge passage of the tip shroud to the outside. Furthermore, the cooling medium flowing through the trailing edge side cooling passage from the base part to the blade tip of the blade main body can be discharged through the second discharge passage of the tip shroud to the outside. In addition, the cooling medium flowing through the intermediate cooling passage from the base part to the blade tip of the blade main body can be discharged through the third discharge passage of the tip shroud to the outside.

According to a sixth aspect of the present invention, the first discharge passage of the turbine blade according to the fifth aspect may extend through the tip shroud in an extending direction of the leading edge side cooling passage.

This configuration can shorten the first discharge passage. This configuration can thus prevent an increase in pressure loss of the cooling medium flowing through the leading edge side cooling passage and prevent a decrease in the flow velocity of the cooling medium. This results in efficient cooling of the leading edge of the blade main body.

According to a seventh aspect of the present invention, the second discharge passage of the turbine blade according to the fifth or sixth aspect may extend through the tip shroud in an extending direction of the trailing edge side cooling passage.

This configuration can shorten the second discharge passage. This configuration can thus prevent an increase in pressure loss of the cooling medium flowing through the trailing edge side cooling passage and prevent a decrease in the flow velocity of the cooling medium. This results in efficient cooling of the trailing edge of the blade main body.

According to an eighth aspect of the present invention, the third discharge passage of the turbine blade according to any one of the fifth to seventh aspects may include a passage main body portion extending in a direction that intersects the extending direction of the leading edge side cooling passage. The passage main body portion may open in a side surface of the tip shroud.

This configuration enables the cooling medium flowing through the intermediate cooling passage to cool the tip shroud while being discharged through the third discharge passage to the outside. Furthermore, the third discharge passage can have a length longer than those of the first discharge passage and the second discharge passage. This configuration can reduce the amount of the cooling medium flowing through the intermediate cooling passage in comparison with that of the cooling medium flowing through the leading edge side cooling passage and the trailing edge side cooling passage and reduce the entire amount of the cooling medium supplied.

According to a ninth aspect of the present invention, the third discharge passage of the turbine blade according to the eighth aspect may include a cavity portion communicating with the intermediate cooling passage and having a flow channel cross-sectional area larger than that of the intermediate cooling passage. The passage main body portion may extend from the cavity portion in a direction that intersects the blade height direction and open in the side surface of the tip shroud.

This configuration enables the third discharge passage to be readily formed in the tip shroud.

According to a tenth aspect of the present invention, a gas turbine includes the turbine blade according to any one of the first to ninth aspects.

This configuration can reduce the amount of the cooling medium for cooling the turbine blade, resulting in enhancement of efficiency.

Advantageous Effects of Invention

According to the turbine blade and the gas turbine, effective cooling is achieved with a minimum amount of a cooling medium supplied.

DESCRIPTION OF EMBODIMENTS

A turbine blade and a gas turbine according to an embodiment of the present invention will now be described with reference to the drawings.

Figure 1:
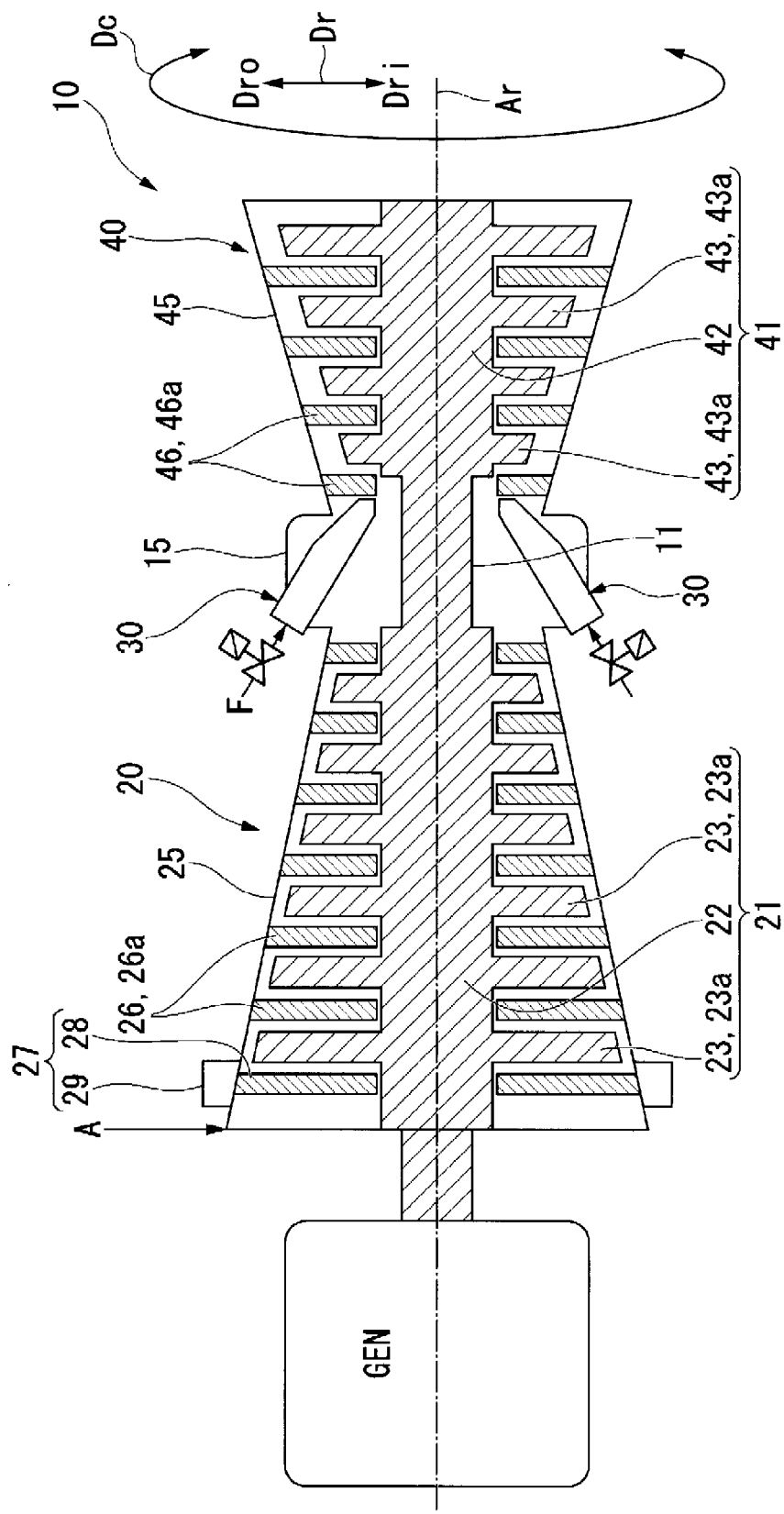
FIG. 1 is a schematic cross-sectional view of a gas turbine according to an embodiment of the present invention.

FIG. 1 is a schematic cross-sectional view of the gas turbine according to the embodiment of the present invention.

As illustrated in FIG. 1, the gas turbine 10 of this embodiment includes a compressor 20, a combustor 30, and a turbine 40.

Hereinafter, the extending direction of an axial line Ar is referred to as "axial direction Da". The circumferential direction with the axial line Ar being the center is simply referred to as "circumferential direction Dc". A direction orthogonal to the axial line Ar is referred to as "radial direction Dr". The compressor 20 side of the turbine 40 in the axial direction Da is referred to as "upstream side Dau", and the side opposite to this side as "downstream side Dad". The direction toward the axial line Ar in the radial direction Dr is referred to as "radially inward Dri", and the opposite direction as "radially outward Dro".

The compressor 20 compresses air A and supplies the air A to the combustor 30. The compressor 20 includes a compressor rotor 21, a compressor casing 25, a plurality of blade rows 23, a plurality of vane rows 26, and an inlet guide vane (IGV) 27.

The compressor rotor 21 rotates about the axial line Ar. The compressor rotor 21 includes a rotor shaft 22 and the blade rows 23. The rotor shaft 22 extends in the axial direction Da with the axial line Ar being the center. The blade rows 23 are arranged in the axial direction Da. The blade rows 23 each include a plurality of blades 23a arranged in the circumferential direction Dc. The blades 23a are attached to the rotor shaft 22.

The compressor casing 25 covers the compressor rotor 21.

The vane rows 26 are arranged on the downstream side Dad of the respective blade rows 23. The vane rows 26 are disposed between the compressor casing 25 and the compressor rotor 21 and each include a plurality of vanes 26a arranged in the circumferential direction Dc.

The IGV 27 is disposed at a suction port of the compressor casing 25. The IGV 27 adjusts the flow volume of the air A taken into the compressor casing 25. The IGV 27 includes a plurality of guide vanes 28 and a driver 29 driving the guide vanes 28.

The combustor 30 combusts fuel in the air compressed by the compressor 20 to generate high-temperature, high-pressure combustion gas. This combustion gas is supplied to the turbine 40.

The turbine 40 is driven with the combustion gas generated by the combustor 30. The turbine 40 includes a turbine rotor 41, a turbine casing 45, a plurality of blade rows 43, and a plurality of vane rows 46.

The turbine rotor 41 rotates about the axial line Ar. The turbine rotor 41 and the above-described compressor rotor 21 are located on the same axial line Ar and connected with each other. The turbine rotor 41 and the compressor rotor 21 compose a gas turbine rotor 11. The gas turbine rotor 11 is connected with, for example, a rotor or the like of a generator GEN.

The turbine casing 45 covers the turbine rotor 41. The turbine casing 45 and the compressor casing 25 are connected with each other. The turbine casing 45 and the compressor casing 25 compose a gas turbine casing 15.

Figure 2:
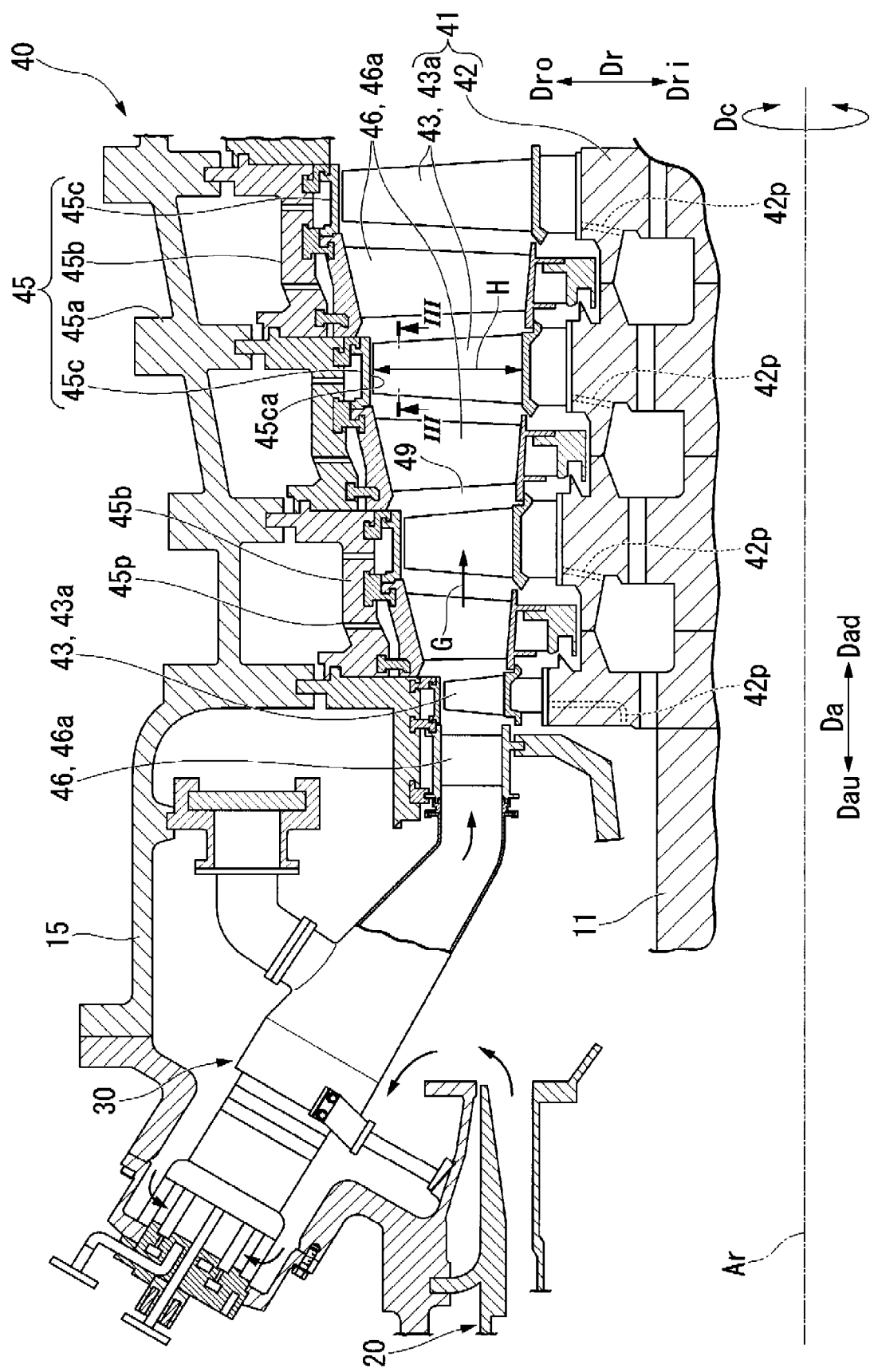
FIG. 2 is a cross-sectional view of the main portion of the gas turbine according to the embodiment of the present invention.

FIG. 2 is a cross-sectional view of the main portion of the gas turbine according to the embodiment of the present invention.

As illustrated in FIG. 2, the turbine rotor 41 includes a rotor shaft 42 and the blade rows 43.

The rotor shaft 42 extends in the axial direction Da with the axial line Ar being the center.

The blade rows 43 are arranged in the axial direction Da. The turbine rotor 41 of this embodiment includes four blade rows 43. The blade rows 43 each include a plurality of blades (turbine blades) 43a arranged in the circumferential direction Dc. The blades 43a are attached to the rotor shaft 42.

The vane rows 46 are arranged on the upstream side Dau of the respective blade rows 43. The vane rows 46 each include a plurality of vanes 46a arranged in the circumferential direction Dc.

The turbine casing 45 includes an outer casing 45a, an inner casing 45b, and a plurality of ring segments 45c.

The outer casing 45a is shaped like a tube being the outer shell of the turbine casing 45.

The inner casing 45b is disposed inside the outer casing 45a and shaped like a tube with a plurality of rings. The inner casing 45b is fixed to the outer casing 45a.

The ring segments 45c are disposed between the vane rows 46 adjacent to each other in the axial direction Da inside the inner casing 45b. In other words, the blade rows 43 are disposed on the radially inward Dri of the respective ring segments 45c.

A ring-shaped space in which the vanes 46a and the blades 43a are disposed is defined between the rotor shaft 42 and the turbine casing 45. The ring-shaped space is a combustion gas flow channel 49 in which the combustion gas G supplied from the combustor 30 flows.

Cooling air passages 42p through which cooling air flows are formed in the rotor shaft 42. The cooling air passes through the cooling air passages 42p and is introduced into the blades 43a to be used for cooling the blades 43a.

Similarly, cooling air passages 45p for cooling air to flow through are formed in the inner casing 45b. The cooling air passages 45p extend through the inner casing 45b from radially outward Dro to radially inward Dri. The cooling air passes through the cooling air passages 45p and is introduced into the vanes 46a and the ring segments 45c to be used for cooling the vanes 46a and the ring segments 45c.

Figure 3:
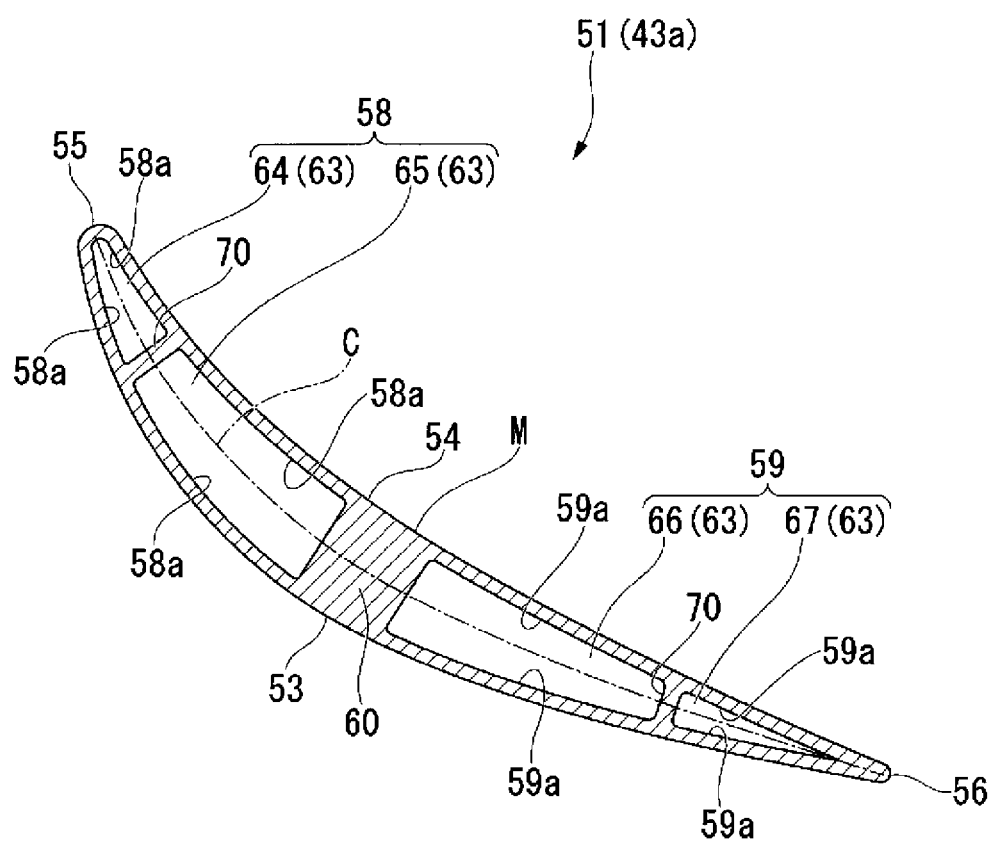
FIG. 3 is a cross-sectional view taken along line III-III in FIG. 2, according to the embodiment of the present invention.
Figure 4:
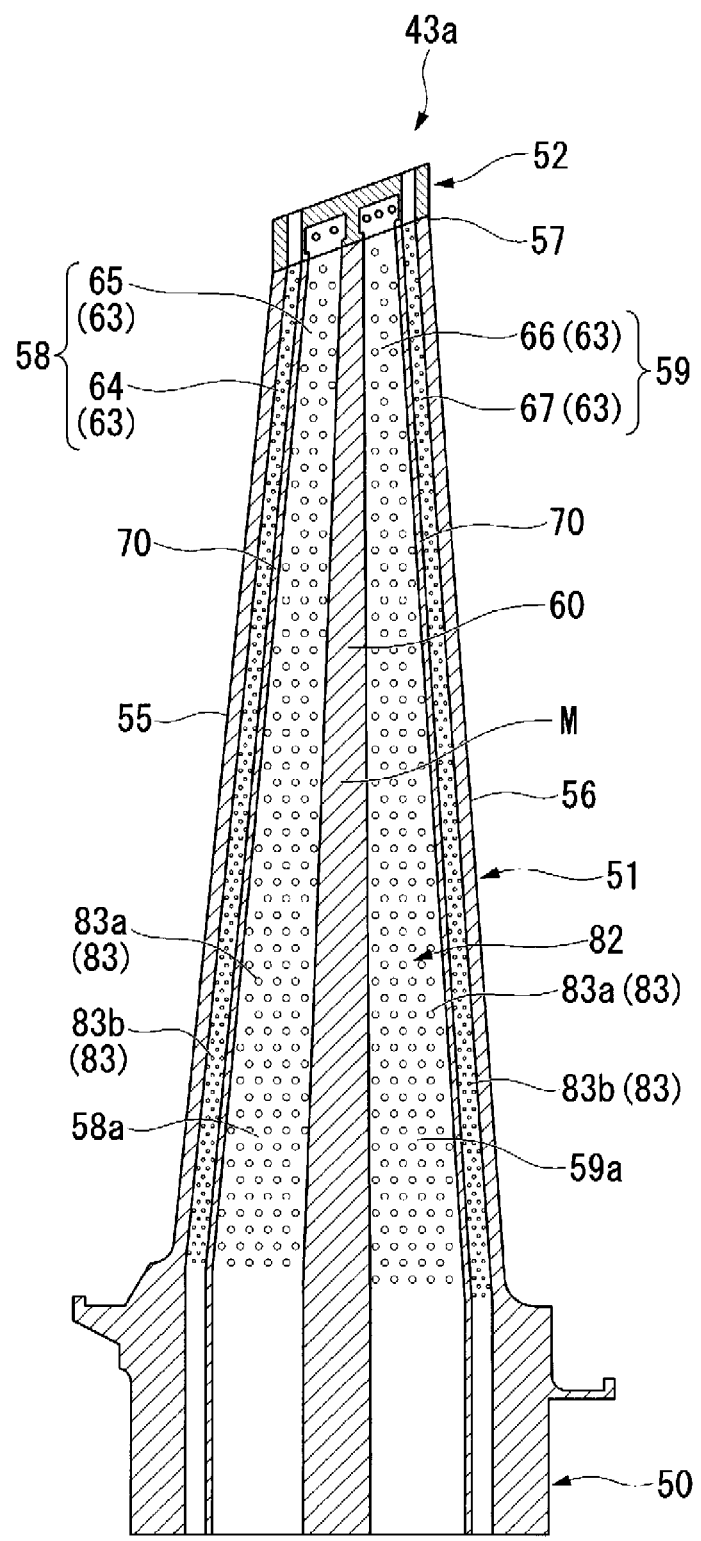
FIG. 4 illustrates a cross section of a blade along a camber line according to the embodiment of the present invention.

FIG. 3 is a cross-sectional view taken along line III-III in FIG. 2, according to the embodiment of the present invention. FIG. 4 illustrates a cross section of the blade along a camber line according to the embodiment of the present invention.

The blade 43a illustrated in FIG. 3 is, for example, a blade 43a composing a part of the third blade row 43 from the upstream side among the above-described four blade rows 43. As illustrated in FIG. 4, the blade 43a includes a blade root 50, a blade main body 51, and a tip shroud 52.

As illustrated in FIG. 3, the blade main body 51 includes a convex suction surface 53, a concave pressure surface 54, a leading edge 55, and a trailing edge 56. The leading edge 55 is the end located farthest on the upstream side Dau in the extending direction of the camber line C being the mean line. The trailing edge is the end located farthest on the downstream side Dad in the extending direction of the camber line C. The blade main body 51 has an airfoil cross section formed by the suction surface 53 and the pressure surface 54 that are continuous with each other through the leading edge 55 and the trailing edge 56. The blade main body 51 of the blade 43a of the third blade row 43 has a blade height H (see FIG. 2) greater than those of the blade main bodies 51 of the blades 43a of the first and second blade rows 43. The blade main body 51 has such a tapered shape that a width gradually decreases from the blade root 50 toward a blade tip 57.

The blade 43a includes a first cooling passage part 58, a second cooling passage part 59, and a column part 60 that are disposed in the blade 43a. The first cooling passage part 58 is disposed near the leading edge 55. The second cooling passage part 59 is disposed near the trailing edge 56. As illustrated in FIG. 4, the first cooling passage part 58 and the second cooling passage part 59 extend in the blade height direction (radial direction Dr) which intersects the above-described airfoil cross section. The first cooling passage part 58 and the second cooling passage part 59 extend through the blade 43a from the blade root 50 (base part) to the blade tip 57 (end part).

The inside of the first cooling passage part 58 and the inside of the second cooling passage part 59 communicate with the cooling air passage 42p on the blade root 50 side. This configuration allows the cooling air from the cooling air passage 42p to flow into the first cooling passage part 58 and the second cooling passage part 59 from the blade root 50 side of the blade 43a. The cooling air flowing into the first cooling passage part 58 and the second cooling passage part 59 flows from the blade root 50 to the blade tip 57 to cool the entire region of the blade 43a from the blade root 50 to the blade tip 57 in the blade height direction.

The column part 60 is disposed between the first cooling passage part 58 and the second cooling passage part 59. The column part 60 is continuously formed between the blade root 50 and the blade tip 57 of the blade main body 51. The column part 60 is formed extending between the suction surface 53 and the pressure surface 54. Similarly to the blade main body 51, the column part 60 of this embodiment has such a tapered shape that a width gradually decreases toward the blade tip 57. Here, the direction along the camber line C in the above-described column part 60 is referred to as "width direction".

The first cooling passage part 58 is composed of a plurality of cooling passages 63. The cooling passages 63 are disposed between the column part 60 and the leading edge 55 and extend in the blade height direction. The cooling passages 63 composing the first cooling passage part 58 are arranged along the camber line C. In this embodiment, the first cooling passage part 58 includes two cooling passages 63. The cooling passage 63 closer to the leading edge 55 of the two cooling passages 63 is hereinafter referred to as "leading edge side cooling passage 64", and the cooling passage 63 closer to the column part 60 as "column side cooling passage 65 (first intermediate cooling passage)".

A partition wall 70 is formed between the leading edge side cooling passage 64 and the column side cooling passage 65 of the first cooling passage part 58. The partition wall 70 has a width in the camber line C direction sufficiently smaller than the width of the above-described column part 60.

Similarly to the first cooling passage part 58, the second cooling passage part 59 is composed of a plurality of cooling passages 63. The cooling passages 63 are disposed between the column part 60 and the trailing edge 56 and extend in the blade height direction. The cooling passages 63 composing the second cooling passage part 59 are arranged along the camber line C. In this embodiment, the second cooling passage part 59 includes two cooling passages 63. The cooling passage 63 closer to the trailing edge 56 of the two cooling passages 63 is hereinafter referred to as "trailing edge side cooling passage 67", and the cooling passage 63 closer to the column part 60 as "column side cooling passage 66 (second intermediate cooling passage)".

Similarly to the first cooling passage part 58, a partition wall 70 is formed between the trailing edge side cooling passage 67 and the column side cooling passage 66 of the second cooling passage part 59. The partition wall 70 has a width in the camber line C direction sufficiently smaller than the width of the above-described column part 60 and equivalent to the width of the partition wall 70 of the first cooling passage part 58.

Here, the width of the column part 60 and the arrangement of the column part 60 in the camber line C direction are determined on the basis of a difference in temperature that may occur between the leading and trailing edges 55, 56 and an intermediate portion M of the blade main body 51 in the camber line C direction.

For example, if a difference in temperature that may occur between the leading and trailing edges 55, 56 and the intermediate portion M is assumed to be great, the width of the column part 60 in the camber line C direction is widened to reduce the difference in temperature. This is because the portion where the column part 60 is arranged is prevented from being cooled, resulting in prevention of a decrease in temperature.

If a difference in temperature that may occur between the leading and trailing edges 55, 56 and the intermediate portion M is assumed to be great, the column part 60 may be arranged with an especially low-temperature point of the intermediate portion M in the camber line C direction being the center. This configuration can efficiently prevent a decrease in temperature at the point where temperature readily decreases.

In the first cooling passage part 58, the leading edge side cooling passage 64 has a flow channel cross-sectional area smaller than that of the column side cooling passage 65. The leading edge side cooling passage 64 and the column side cooling passage 65 are supplied with the cooling air. The column side cooling passage 65 has a mechanism preventing the cooling air from flowing to the blade root 50 side or the blade tip 57 side. This mechanism is, for example, an orifice disposed on the blade root 50 side or a cavity portion of the tip shroud 52 disposed at the blade tip 57. Thus, the cooling air flows faster in the leading edge side cooling passage 64 than in the column side cooling passage 65. In other words, in the first cooling passage part 58, the heat transfer rate of the cooling air flowing in the leading edge side cooling passage 64 is higher than that of the cooling air flowing in the column side cooling passage 65, so that the leading edge side cooling passage 64 has higher cooling performance than the column side cooling passage 65.

Similarly to the first cooling passage part 58, in the second cooling passage part 59, the trailing edge side cooling passage 67 has a flow channel cross-sectional area smaller than that of the column side cooling passage 66 of the second cooling passage part 59. The trailing edge side cooling passage 67 and the column side cooling passage 66 are supplied with the cooling air. Similarly to the column side cooling passage 66, the column side cooling passage 66 has a mechanism preventing the flow of the cooling air. Thus, the cooling air flows faster in the trailing edge side cooling passage 67 than in the column side cooling passage 66. That is, the trailing edge side cooling passage 67 has higher cooling performance than the column side cooling passage 66.

Figure 5:
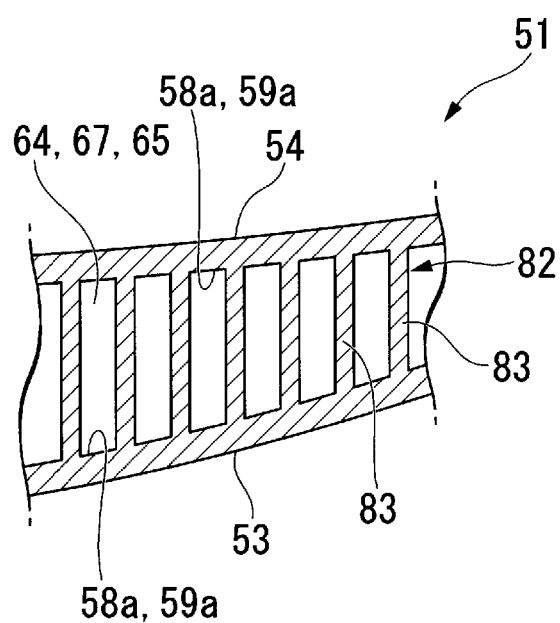
FIG. 5 is a partial cross-sectional view of a columnar pin fin according to the embodiment of the present invention.

FIG. 5 is a partial cross-sectional view of a columnar pin fin according to the embodiment of the present invention.

As illustrated in FIGS. 4 and 5, the columnar pin fin 82 is disposed in each of the first cooling passage part 58 and the second cooling passage part 59. The columnar pin fin 82 includes a plurality of protrusions 83. The protrusions 83 are shaped like columns extending from the inner surface of the suction surface 53 and the inner surface of the pressure surface 54. FIG. 4 exemplifies the case in which the columnar pin fin 82 is disposed on the entire inner wall surfaces 58a, 59a of the leading edge side cooling passage 64, the trailing edge side cooling passage 67, and the column side cooling passages 65, 66. However, the range of disposing the columnar pin fin 82 is not limited to the entire surfaces. For example, a region where no columnar pin fin 82 is disposed may be provided on part of the inner wall surfaces 58a, 59a in the blade height direction or on part of the inner wall surfaces 58a, 59a in the extending direction of the camber line C. Note that the columnar pin fin 82 is not illustrated in FIG. 3.

As illustrated in FIG. 4, the protrusions 83 of the columnar pin fin 82 include first protrusions 83a and second protrusions 83b having mutually different dimensions. The first protrusions 83a are disposed on the inner wall surfaces 58a, 59a of the column side cooling passages 65, 66. The second protrusions 83b are disposed on the inner wall surfaces 58a, 59a of the leading edge side cooling passage 64 and the trailing edge side cooling passage 67. The second protrusions 83b are formed relatively smaller than the first protrusions 83a. For example, the second protrusions 83b have surface areas smaller than those of the first protrusions 83a.

Figure 6:
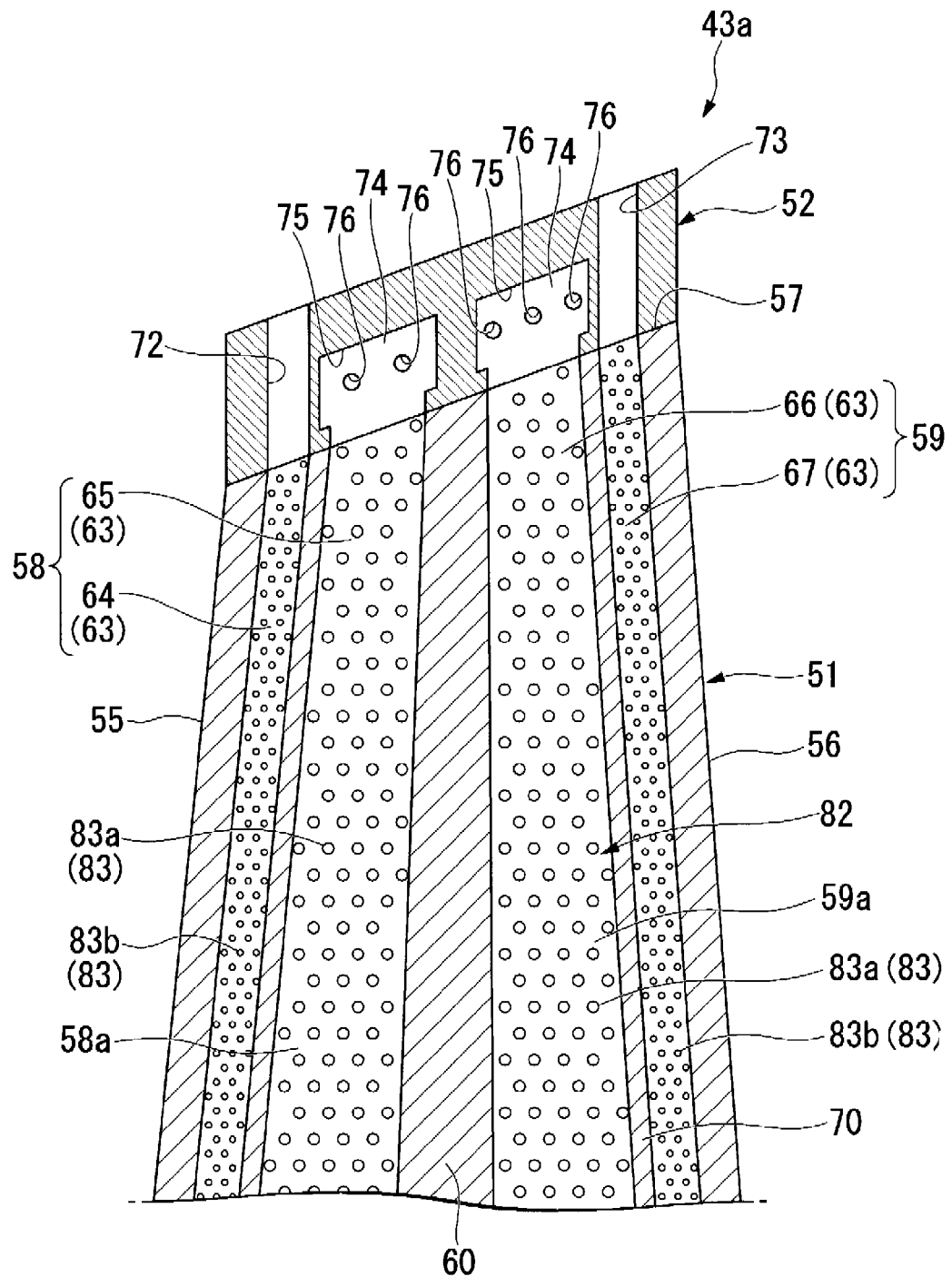
FIG. 6 is an enlarged view of a blade tip and its vicinity of the blade in FIG. 3 according to the embodiment of the present invention.

FIG. 6 is an enlarged view of the blade tip and its vicinity of the blade in FIG. 3 according to the embodiment of the present invention.

Figure 7:
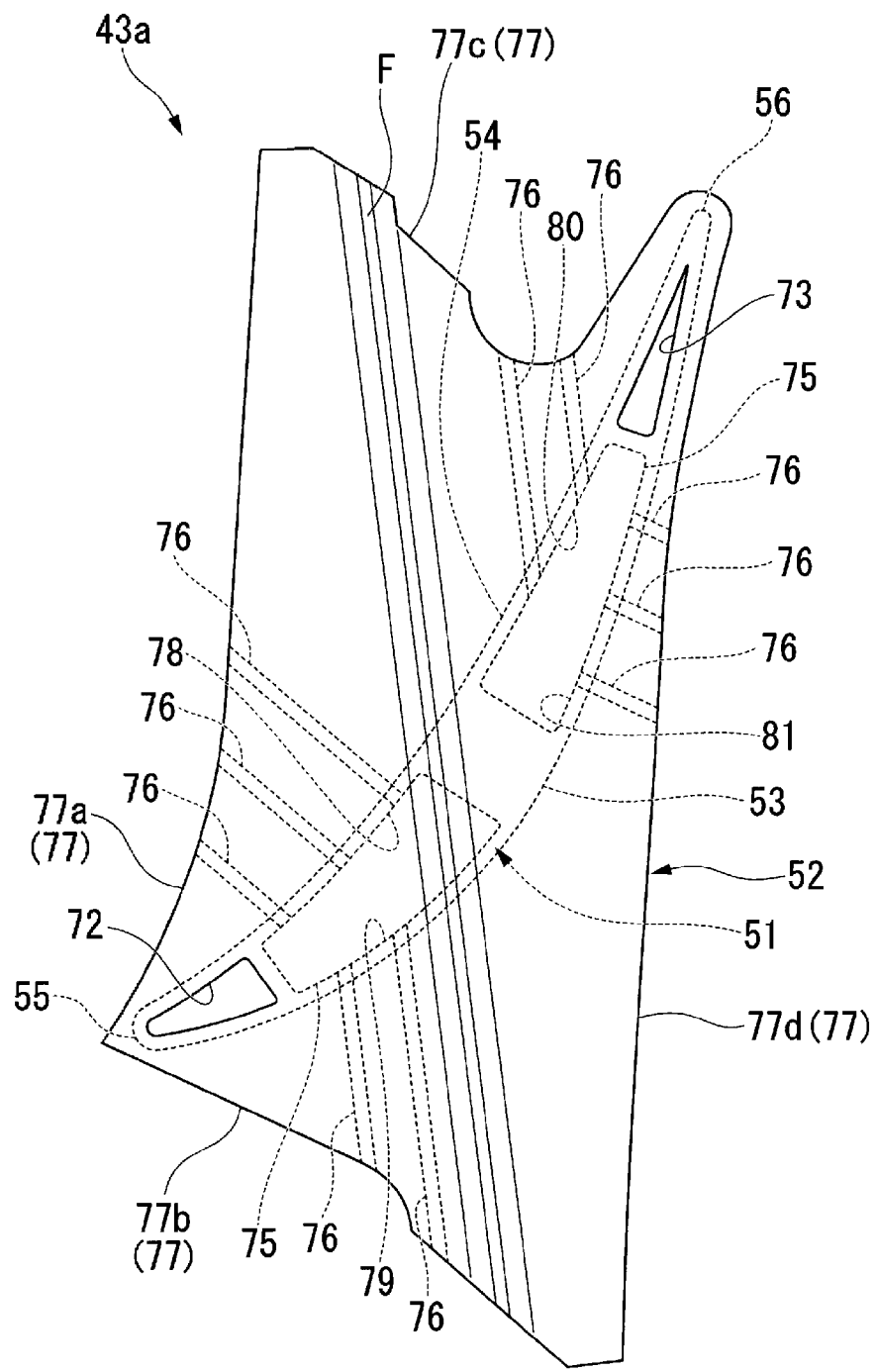
FIG. 7 is a plan view of a tip shroud according to the embodiment of the present invention.

FIG. 7 is a plan view of the tip shroud according to the embodiment of the present invention.

As illustrated in FIGS. 6 and 7, the tip shroud 52 is provided integrally with the blade tip 57 of the blade main body 51. The blades 43a are arranged in the circumferential direction, so that the tip shrouds 52 are arranged in the circumferential direction Dc, forming a ring.

The tip shroud 52 is provided with a fin F (See FIG. 7) disposed at the center or the like in the axial direction Da on the outer peripheral surface of the tip shroud 52. The fin F protrudes radially outward Dro. This configuration provides a small gap between the fin F and the ring segment 45c, resulting in a reduction in a leakage of the combustion gas G. If a gap between the blade 43a and the ring segment 45c decreases due to some cause, the fin F comes into contact with the ring segment 45c first. The fin F comes into contact with the ring segment 45c first in this way, so that damage to the ring segment 45c and the blade 43a can be reduced.

The tip shroud 52 includes a first discharge passage 72, a second discharge passage 73, and a third discharge passage 74. The first discharge passage 72, the second discharge passage 73, and the third discharge passage 74 discharge the above-described cooling air flowing in the blade main body 51 to the outside of the blade main body 51.

As illustrated in FIG. 6, the first discharge passage 72, the third discharge passage 74, and the second discharge passage 73 are formed in the tip shroud 52 in this order from the leading edge 55 side toward the trailing edge 56 side.

The first discharge passage 72 discharges the cooling air flowing through the leading edge side cooling passage 64. The first discharge passage 72 is formed extending through the tip shroud 52 in the extending direction of the leading edge side cooling passage 64 (blade height direction). In other words, the first discharge passage 72 extends radially outward Dro from the leading edge side cooling passage 64 and opens radially outward Dro. The first discharge passage 72 of this embodiment has the same flow channel cross-sectional shape as that of the leading edge side cooling passage 64. This means that the cooling air flowing through the leading edge side cooling passage 64 flows radially outward Dro from the blade root 50 to the blade tip 57 of the blade 43a and is discharged radially outward Dro of the tip shroud 52 without changing the flowing direction. The cooling air blows through the tip shroud 52 in this way, so that the leading edge side cooling passage 64 causes a low pressure loss and can increase the flow velocity of the cooling air.

The second discharge passage 73 discharges the cooling air flowing through the trailing edge side cooling passage 67. The second discharge passage 73 is formed extending through the tip shroud 52 in the extending direction of the trailing edge side cooling passage 67. In other words, similarly to the first discharge passage 72, the second discharge passage 73 extends from the trailing edge side cooling passage 67 radially outward Dro and opens radially outward Dro. The second discharge passage 73 of this embodiment has the same flow channel cross-sectional shape as that of the trailing edge side cooling passage 67. This means that the cooling air flowing through the trailing edge side cooling passage 67 flows radially outward Dro from the blade root 50 to the blade tip 57 of the blade 43a and is discharged radially outward Dro of the tip shroud 52 without changing the flowing direction. The cooling air blows through the tip shroud 52 in this way, so that the trailing edge side cooling passage 67 causes a low pressure loss and can increase the flow velocity of the cooling air.

The third discharge passage 74 discharges the cooling air flowing through the column side cooling passages 65, 66 to the outside of the blade 43a. The third discharge passage 74 includes cavity portions 75 and passage main body portions 76. In this embodiment, two cavity portions 75 are provided. The cavity portions 75 are disposed radially outward Dro of the column side cooling passage 65 of the first cooling passage part 58 and radially outward Dro of the column side cooling passage 66 of the second cooling passage part 59. The cavity portions 75 communicate with the column side cooling passage 65 of the first cooling passage part 58 and the column side cooling passage 66 of the second cooling passage part 59. In other words, the cavity portions 75 do not communicate with the leading edge side cooling passage 64 and the trailing edge side cooling passage 67.

As illustrated in FIG. 7, the passage main body portions 76 extend along the tip shroud 52. In other words, the passage main body portions 76 extend in directions that intersect the extending direction of the column side cooling passages 65, 66 (blade height direction). The passage main body portions 76 each open in a side surface of the tip shroud 52. The passage main body portions 76 of this embodiment extend from the cavity portions 75 along the tip shroud 52 and open in the side surfaces 77 of the tip shroud 52. The passage main body portions 76 extend in facing directions of the suction surface 53 of the blade main body 51 and in facing directions of the pressure surface 54. In this embodiment, each of the passage main body portions 76 extends from the cavity portion 75 to the closest side surface 77 of the tip shroud 52.

Specifically, the third discharge passage 74 includes a plurality of the passage main body portions 76 formed between an inner side surface 78, closer to the pressure surface 54, of the cavity portion 75 on the leading edge 55 side and a side surface 77a, facing the upstream side Dau, of the tip shroud 52. Similarly, the third discharge passage 74 includes a plurality of the passage main body portions 76 formed between an inner side surface 79, closer to the suction surface 53, of the cavity portion 75 on the leading edge 55 side and a side surface 77b, facing the circumferential direction Dc, of the tip shroud 52.

Furthermore, the third discharge passage 74 includes a plurality of the passage main body portions 76 formed between an inner side surface 80, closer to the pressure surface 54, of the cavity portion 75 on the trailing edge 56 side and a side surface 77c, facing the circumferential direction Dc, of the tip shroud 52. Similarly, the third discharge passage 74 includes a plurality of the passage main body portions 76 formed between an inner side surface 81, closer to the suction surface 53, of the cavity portion 75 on the trailing edge 56 side and a side surface 77d, facing the downstream side Dad, of the tip shroud 52.

This embodiment has exemplified the case in which the passage main body portions 76 are formed into linear shapes. However, the shapes of the passage main body portions 76 are not limited to linear shapes. For example, the passage main body portions 76 may have shapes including curves, such as circular arc shapes and S-shapes. This embodiment has exemplified the case in which the passage main body portions 76 opening in the same side surface 77 are arranged parallel with each other; however, the arrangement is not limited to parallel arrangement. The passage main body portions 76 may be arranged separating from each other as they approach the side surface 77.

According to the above-described embodiment, the cooling air flows through the first cooling passage part 58 having the inner wall surface 58a on which the protrusions 83 are formed, so that the leading edge 55 side of the blade main body 51 can be cooled efficiently.

Similarly, the cooling air flows through the second cooling passage part 59 having the inner wall surface 59a on which the protrusions 83 are formed, so that the trailing edge 56 side of the blade main body 51 can be cooled. Especially the leading edge 55 side and the trailing edge 56 side, which readily reach high temperature, can be effectively cooled with the first cooling passage part 58 and the second cooling passage part 59, and the column part 60 is disposed in a portion relatively difficult to reach high temperature between the leading edge 55 and the trailing edge 56. This configuration can reduce the cross-sectional area of the entire cooling passage.

The column part 60 is continuously formed between the blade root 50 and the blade tip 57 of the blade main body 51 between the first cooling passage part 58 and the second cooling passage part 59, so that the cooling air does not flow in the portion where the column part 60 is formed. Thus, the turbine blade of this embodiment can prevent a decrease in temperature at the intermediate portion M between the first cooling passage part 58 and the second cooling passage part 59. This means that a difference in temperature between the leading and trailing edges 55, 56 and the intermediate portion M between the first cooling passage part 58 and the second cooling passage part 59 can be reduced, and the cooling air flowing through the cooling passage can be prevented from heating up. Furthermore, the column part 60 can enhance strength of the blade 43a. This can prevent thermal bending and ensure sufficient strength.

The turbine blade of this embodiment has a structure in which each of the first cooling passage part 58 and the second cooling passage part 59 includes the columnar pin fin 82, and can thus ensure a certain cross-sectional area and yield cooling effect in comparison with conventional turbine blades having multi-holes. This structure can minimize pressure loss when the cooling air flows through the cooling passage and reduce the supply pressure of the cooling air. Thus, the amount of the supplied cooling air required for cooling the blade 43a can be minimized.

According to the above-described embodiment, in the first cooling passage part 58, the leading edge side cooling passage 64 has a flow channel cross-sectional area smaller than that of the column side cooling passage 65 and thus causes a lower pressure loss. Contrarily, the column side cooling passage 65 causes a higher pressure loss due to the mechanism preventing the flow of the cooling air (for example, an orifice disposed on the blade root 50 side and the cavity portion 75 of the tip shroud 52). Thus, in the turbine blade of this embodiment, the cooling air flowing through the leading edge side cooling passage 64 can have a higher flow velocity, resulting in enhancement of cooling performance in a portion closer to the leading edge 55. This results in effective cooling on the leading edge 55 side provided with the leading edge side cooling passage 64, which readily reaches high temperature relative to the portion provided with the column side cooling passage 65, and can thus further reduce a difference in temperature between the leading edge 55 and the column part 60 and minimize the amount of the supplied cooling air required for cooling the leading edge 55 side of the blade 43a.

Similarly, in the second cooling passage part 59, the trailing edge side cooling passage 67 has a flow channel cross-sectional area smaller than that of the column side cooling passage 66 and thus causes a lower pressure loss. Contrarily, the column side cooling passage 66 causes a higher pressure loss due to the mechanism preventing the flow of the cooling air (for example, an orifice disposed on the blade root 50 side and the cavity portion 75). Thus, in the turbine blade of this embodiment, the cooling air flowing through the trailing edge side cooling passage 67 can have a higher flow velocity, resulting in enhancement of cooling performance in a portion closer to the trailing edge 56. This results in effective cooling on the trailing edge 56 side provided with the trailing edge side cooling passage 67, which readily reaches high temperature relative to the portion provided with the column side cooling passage 66, and can thus further reduce a difference in temperature between the trailing edge 56 and the column part 60 and minimize the amount of the supplied cooling air required for cooling the trailing edge 56 side of the blade 43a.

According to the above-described embodiment, the first protrusions 83a are formed smaller than the second protrusions 83b. Thus, the turbine blade of this embodiment can reduce pressure loss of the cooling air flowing through the leading edge side cooling passage 64 and the trailing edge side cooling passage 67. By contrast, the pressure loss of the cooling air flowing through the column side cooling passages 65, 66 can be increased in comparison with that of the cooling air flowing through the leading edge side cooling passage 64 and the trailing edge side cooling passage 67. Thus, the flow velocity of the cooling air flowing through the column side cooling passages 65, 66 can be reduced relative to the flow velocity of the cooling air flowing through the leading edge side cooling passage 64 and the trailing edge side cooling passage 67. This results in effective cooling on the leading edge 55 side and the trailing edge 56 side, and in the entire amount of the cooling air supplied being able to be reduced by reducing the amount of the cooling air flowing through the column side cooling passages 65, 66. Furthermore, a difference in temperature between the leading and trailing edges 55, 56 and the intermediate portion M between the leading edge 55 and the trailing edge 56 can be further reduced even in an environment in which the difference in temperature between the leading and trailing edges 55, 56 and the intermediate portion M readily increases.

In a configuration in which the blade 43a includes the tip shroud 52 in the turbine blade of this embodiment, the cooling air flowing through the leading edge side cooling passage 64 from the blade root 50 to the blade tip 57 of the blade main body 51 can be discharged through the first discharge passage 72 of the tip shroud 52 to the outside. Furthermore, the cooling air flowing through the trailing edge side cooling passage 67 from the blade root 50 to the blade tip 57 of the blade main body 51 can be discharged through the second discharge passage 73 of the tip shroud 52 to the outside. In addition, the cooling air flowing through the column side cooling passages 65, 66 from the blade root 50 to the blade tip 57 of the blade main body 51 can be discharged through the third discharge passage 74 of the tip shroud 52 to the outside. This configuration allows the cooling air flowing through the leading edge side cooling passage 64, the trailing edge side cooling passage 67, and the column side cooling passages 65, 66 to be separately discharged to the outside of the blade 43a. Furthermore, the cooling air flowing through the leading edge side cooling passage 64, the trailing edge side cooling passage 67, and the column side cooling passages 65, 66 can be easily varied in flow velocity only by changing the flow channel cross-sectional areas of the first discharge passage 72, the second discharge passage 73, and the third discharge passage 74.

In the turbine blade of this embodiment, the first discharge passage 72 and the second discharge passage 73 can be formed shorter by having them extend through the tip shroud 52 in the blade height direction. This configuration can prevent an increase in pressure loss of the cooling air flowing through the leading edge side cooling passage 64 and the trailing edge side cooling passage 67 and prevent a decrease in the flow velocity of the cooling air. This results in efficient cooling of the leading edge 55 and the trailing edge 56 of the blade main body 51.

In the turbine blade of this embodiment, the passage main body portions 76 of the third discharge passage 74 are formed along the tip shroud 52, so that the cooling air flowing through the column side cooling passages 65, 66 can cool the tip shroud 52 while being discharged through the third discharge passage 74 to the outside.

In the turbine blade of this embodiment, the third discharge passage 74 can have a length longer than those of the first discharge passage 72 and the second discharge passage 73. This configuration can reduce the amount of the cooling air flowing through the column side cooling passages 65, 66 in comparison with that of the cooling air flowing through the leading edge side cooling passage 64 and the trailing edge side cooling passage 67 and reduce the overall amount of the cooling air supplied.

The cavity portions 75 having large cross-sectional areas are formed in the tip shroud 52. Thus, when the passage main body portions 76 are formed from the side surfaces 77 toward the cavity portions 75, for example, slight shift in position is permitted. Thus, the third discharge passage 74 can be easily formed. Furthermore, this configuration reduces the weight of the tip shroud 52, resulting in a reduction in the centrifugal load.

The amount of the cooling air for cooling the blade 23a can be reduced, resulting in enhancement of efficiency of the gas turbine 10.

The present invention is not limited to the above-described embodiment, and includes the above-described embodiment with various modifications added thereto without deviating from the spirit of the present invention. That is, specific shapes, configurations, and the like in the embodiment are merely examples and may be appropriately modified.

Figure 8:
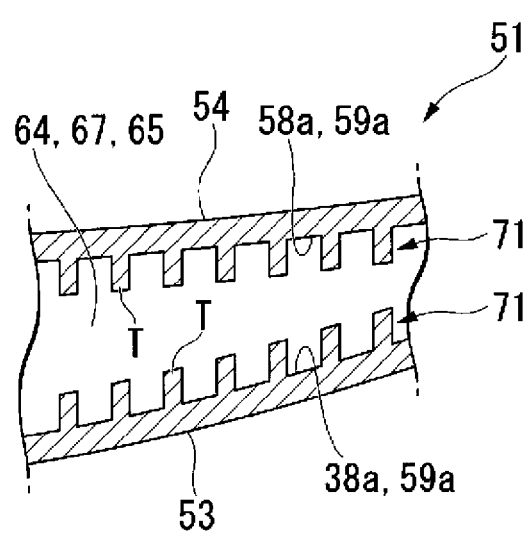
FIG. 8 is a partial cross-sectional view corresponding to FIG. 5, according to a modified example of the embodiment of the present invention.

FIG. 8 is a partial cross-sectional view corresponding to FIG. 5, according to a modified example of the embodiment of the present invention.

For example, the above-described embodiment has exemplified the case in which the columnar pin fin 82 is formed. However, the present invention is not limited to the configuration having the columnar pin fin 82. For example, one-sided pin fins 71 may be provided instead of the columnar pin fin 82 as in the modified example illustrated in FIG. 8. The one-sided pin fins 71 are composed of projections (protrusions) T protruding inward from the inner wall surfaces 58a, 59a of the first cooling passage part 58 and the second cooling passage part 59, and may be disposed on the inner wall surfaces 58a, 59a of the leading edge side cooling passage 64, the trailing edge side cooling passage 67, and the column side cooling passage 65, 66. Similarly to the above-described columnar pin fin 82, the one-sided pin fins 71 may include first projections (first protrusions: not illustrated) and second projections (second protrusions: not illustrated)

having mutually different dimensions. Furthermore, for example, the first projections may be disposed on the inner wall surfaces 58a, 59a of the column side cooling passages 65, 66, and the second projections may be disposed on the inner wall surfaces 58a, 59a of the leading edge side cooling passage 64 and the trailing edge side cooling passage 67. In this case, the second projections may be formed relatively smaller than the first projections. For example, the second projections may have surface areas smaller than those of the first projections.

The above-described embodiment has exemplified the case in which the blade main body 51 includes both the leading edge side cooling passage 64 and the trailing edge side cooling passage 67. However, the present invention is not limited to this configuration. For example, the blade main body may include only either one of the leading edge side cooling passage 64 and the trailing edge side cooling passage 67.

Similarly, the above-described embodiment has exemplified the case in which the first cooling passage part 58 includes the two cooling passages 63 (the leading edge side cooling passage 64 and the column side cooling passage 65) and the second cooling passage part 59 includes the two cooling passages 63 (the trailing edge side cooling passage 67 and the column side cooling passage 66). However, the first cooling passage part 58 may be composed of one cooling passage 63, and similarly, the second cooling passage part 59 may be composed of one cooling passage 63.

The embodiment has exemplified the case in which the second protrusions 83b are smaller than the first protrusions 83a. However, the present invention is not limited to this configuration. For example, the first protrusions 83a and the second protrusions 83b may have the same dimensions, and the number of the second protrusions 83b per unit area may be smaller than the number of the first protrusions 83a per unit area. Alternatively, the first protrusions 83a and the second protrusions 83b may have the same configuration, that is, they may be formed in the same dimensions and in the same number.

The above-described embodiment has exemplified the case in which the cooling medium is air; however, the cooling medium is not limited to air.

The above-described embodiment has exemplified the case in which the third discharge passage 74 includes the cavity portions 75. However, the cavity portions 75 may be omitted.

The above-described embodiment has exemplified the case in which the passage main body portions 76 of the third discharge passage 74 are formed along the tip shroud 52 and open in the side surfaces 77. However, the present invention is not limited to this configuration. The passage main body portions 76 may open in the tip shroud 52 in the vicinities of the side surface 77, for example.

The above-described embodiment has exemplified the case in which the first discharge passage 72 and the second discharge passage 73 extend through the tip shroud 52 in the blade height direction. However, the direction in which the first discharge passage 72 and the second discharge passage 73 extend is not limited to the blade height direction as long as the first discharge passage 72 and the second discharge passage 73 are formed shorter than the third discharge passage 74.

The above-described embodiment has exemplified the blade 43a of the third blade row 43. However, the blade 43a may be any blade including the tip shroud 52 and may be a blade 43a of a blade row 43 other than the third blade row.

REFERENCE SIGNS LIST

10 Gas turbine
11 Gas turbine rotor
15 Gas turbine casing
20 Compressor
21 Compressor rotor
22 Rotor shaft
23 Blade row
25 Compressor casing
26 Vane row
26a Vane
30 Combustor
40 Turbine
41 Turbine rotor
42 Rotor shaft
42p Cooling air passage
43 Blade row
43a Blade
45 Turbine casing
45a Outer casing
45b Inner casing
45c Ring segment
45p Cooling air passage
46 Vane row
46a Vane
49 Combustion gas flow channel
50 Blade root
51 Blade main body
52 Tip shroud
53 Suction surface
54 Pressure surface
55 Leading edge
56 Trailing edge
57 Blade tip
58 First cooling passage part
58a Inner wall surface
59 Second cooling passage part
59a Inner wall surface
60 Column part
62 First end portion
63 Cooling passage
64 Leading edge side cooling passage
65 Column side cooling passage
66 Column side cooling passage
67 Trailing edge side cooling passage
70 Partition wall
71 One-sided pin fin
72 First discharge passage
73 Second discharge passage
74 Third discharge passage
75 Cavity portion
76 Passage main body portion
77 Side surface
77a Side surface
77b Side surface
77c Side surface
77d Side surface
78 Inner side surface
79 Inner side surface
80 Inner side surface
81 Inner side surface
82 Columnar pin fin
83 Protrusion 83*a* First protrusion
83*b* Second protrusion
T Projection
F Fin
M Intermediate portion

The invention claimed is:

1. A turbine blade comprising a blade main body comprising a leading edge, a trailing edge, and a pressure surface and a suction surface disposed between the leading edge and the trailing edge, the blade main body comprising:
a first cooling passage part disposed near the leading edge, a cooling medium flowing through the first cooling passage part;
a second cooling passage part disposed near the trailing edge, the cooling medium flowing through the second cooling passage part; and
a column part disposed between the first cooling passage part and the second cooling passage part and continuously formed between a base part and an end part of the blade main body,
the first cooling passage part comprising a plurality of cooling passages divided by a partition wall continuously formed between the base part and the end part of the blade main body so that the cooling passages extend in a blade height direction between the column part and the leading edge and are aligned along a mean line,
the second cooling passage part comprising a plurality of cooling passages divided by a partition wall so that the cooling passages extend in the blade height direction between the column part and the trailing edge and are aligned along the mean line, and
the column part having a thickness in an extending direction of the mean line greater than the thickness of each of the partition walls in the extending direction of the mean line.

2. A turbine blade comprising a blade main body comprising a leading edge, a trailing edge, and a pressure surface and a suction surface disposed between the leading edge and the trailing edge, the blade main body comprising:
a first cooling passage part disposed near the leading edge, a cooling medium flowing through the first cooling passage part in a flowing direction;
a second cooling passage part disposed near the trailing edge, the cooling medium flowing through the second cooling passage part; and
a column part disposed between the first cooling passage part and the second cooling passage part and continuously formed between a base part and an end part of the blade main body,
the first cooling passage part comprising a plurality of cooling passages divided by a partition wall so that the cooling passages extend in a blade height direction between the column part and the leading edge and are aligned along a mean line, the cooling medium flowing through the cooling passages from the base part to the end part of the blade main body without changing the flowing direction,
the second cooling passage part comprising a plurality of cooling passages divided by a partition wall so that the cooling passages extend in the blade height direction between the column part and the trailing edge and are aligned along the mean line, the cooling medium flowing through the cooling passages from the base part to the end part of the blade main body without changing a flowing direction, and
the column part having a thickness in an extending direction of the mean line greater than the thickness of each of the partition walls in the extending direction of the mean line.

3. A turbine blade comprising a blade main body comprising a leading edge, a trailing edge, and a pressure surface and a suction surface disposed between the leading edge and the trailing edge, the blade main body comprising:
a first cooling passage part disposed near the leading edge, a cooling medium flowing through the first cooling passage part;
a second cooling passage part disposed near the trailing edge, the cooling medium flowing through the second cooling passage part; and
a column part disposed between the first cooling passage part and the second cooling passage part and continuously formed between a base part and an end part of the blade main body,
the first cooling passage part comprising a plurality of cooling passages divided by a partition wall so that the cooling passages extend in a blade height direction between the column part and the leading edge and are aligned along a mean line,
the second cooling passage part comprising a plurality of cooling passages divided by a partition wall so that the cooling passages extend in the blade height direction between the column part and the trailing edge and are aligned along the mean line,
the column part having a thickness in an extending direction of the mean line greater than the thickness of each of the partition walls in the extending direction of the mean line, and
the column part comprising no cooling passage through which the cooling medium flows.

4. The turbine blade according to claim 1, wherein
the cooling passages of the first cooling passage part comprise a leading edge side cooling passage and a first intermediate cooling passage, the leading edge side cooling passage extending in the blade height direction between the column part and the leading edge, being arranged along the mean line, and being arranged closest to the leading edge, the first intermediate cooling passage being arranged closer to the column part than the leading edge side cooling passage is and having a flow channel cross-sectional area larger than that of the leading edge side cooling passage, and
the cooling passages of the second cooling passage part comprise a trailing edge side cooling passage and a second intermediate cooling passage, the trailing edge side cooling passage extending in the blade height direction between the column part and the trailing edge, being arranged along the mean line, and being arranged closest to the trailing edge, the second intermediate cooling passage being arranged closer to the column part than the trailing edge side cooling passage is and having a flow channel cross-sectional area larger than that of the trailing edge side cooling passage.

5. The turbine blade according to claim 2, wherein
the cooling passages of the first cooling passage part comprise a leading edge side cooling passage and a first intermediate cooling passage, the leading edge side cooling passage extending in the blade height direction between the column part and the leading edge, being arranged along the mean line, and being arranged closest to the leading edge, the first intermediate cooling passage being arranged closer to the column part than the leading edge side cooling passage is and having a flow channel cross-sectional area larger than that of the leading edge side cooling passage, and the cooling passages of the second cooling passage part comprise a trailing edge side cooling passage and a second intermediate cooling passage, the trailing edge side cooling passage extending in the blade height direction between the column part and the trailing edge, being arranged along the mean line, and being arranged closest to the trailing edge, the second intermediate cooling passage being arranged closer to the column part than the trailing edge side cooling passage is and having a flow channel cross-sectional area larger than that of the trailing edge side cooling passage.

6. The turbine blade according to claim 3, wherein
the cooling passages of the first cooling passage part comprise a leading edge side cooling passage and a first intermediate cooling passage, the leading edge side cooling passage extending in the blade height direction between the column part and the leading edge, being arranged along the mean line, and being arranged closest to the leading edge, the first intermediate cooling passage being arranged closer to the column part than the leading edge side cooling passage is and having a flow channel cross-sectional area larger than that of the leading edge side cooling passage, and the cooling passages of the second cooling passage part comprise a trailing edge side cooling passage and a second intermediate cooling passage, the trailing edge side cooling passage extending in the blade height direction between the column part and the trailing edge, being arranged along the mean line, and being arranged closest to the trailing edge, the second intermediate cooling passage being arranged closer to the column part than the trailing edge side cooling passage is and having a flow channel cross-sectional area larger than that of the trailing edge side cooling passage.

7. The turbine blade according to claim 4, further comprising a plurality of protrusions protruding from an inner wall surface of the first cooling passage part and an inner wall surface of the second cooling passage part.

8. The turbine blade according to claim 7, wherein
the protrusions comprise first protrusions and second protrusions smaller than the first protrusions,
the first protrusions are disposed in at least one of the first intermediate cooling passage and the second intermediate cooling passage, and
the second protrusions are disposed in at least one of the leading edge side cooling passage and the trailing edge side cooling passage.

9. The turbine blade according to claim 1, further comprising a tip shroud disposed at a blade tip of the blade main body, wherein
the tip shroud comprises:
a first discharge passage discharging the cooling medium flowing through a leading edge side cooling passage arranged closest to the leading edge among the cooling passages of the first cooling passage part;
a second discharge passage discharging the cooling medium flowing through a trailing edge side cooling passage arranged closest to the trailing edge among the cooling passages of the second cooling passage part; and
a third discharge passage discharging the cooling medium flowing through an intermediate cooling passage disposed between the leading edge side cooling passage and the trailing edge side cooling passage.

10. The turbine blade according to claim 2, further comprising a tip shroud disposed at a blade tip of the blade main body, wherein
the tip shroud comprises:
a first discharge passage discharging the cooling medium flowing through a leading edge side cooling passage arranged closest to the leading edge among the cooling passages of the first cooling passage part;
a second discharge passage discharging the cooling medium flowing through a trailing edge side cooling passage arranged closest to the trailing edge among the cooling passages of the second cooling passage part; and
a third discharge passage discharging the cooling medium flowing through an intermediate cooling passage disposed between the leading edge side cooling passage and the trailing edge side cooling passage.

11. The turbine blade according to claim 3, further comprising a tip shroud disposed at a blade tip of the blade main body, wherein
the tip shroud comprises:
a first discharge passage discharging the cooling medium flowing through a leading edge side cooling passage arranged closest to the leading edge among the cooling passages of the first cooling passage part;
a second discharge passage discharging the cooling medium flowing through a trailing edge side cooling passage arranged closest to the trailing edge among the cooling passages of the second cooling passage part; and
a third discharge passage discharging the cooling medium flowing through an intermediate cooling passage disposed between the leading edge side cooling passage and the trailing edge side cooling passage.

12. The turbine blade according to claim 9, wherein the first discharge passage extends through the tip shroud in an extending direction of the leading edge side cooling passage.

13. The turbine blade according to claim 9, wherein the second discharge passage extends through the tip shroud in an extending direction of the trailing edge side cooling passage.

14. The turbine blade according to claim 9, wherein
the third discharge passage comprises a passage main body portion extending along the tip shroud, and
the passage main body portion opens in a side surface of the tip shroud.

15. The turbine blade according to claim 14, wherein
the third discharge passage comprises a cavity portion communicating with the intermediate cooling passage and having a flow channel cross-sectional area larger than that of the intermediate cooling passage, and
the passage main body portion extends from the cavity portion in a direction that intersects the blade height direction and opens in the side surface of the tip shroud.

16. A gas turbine comprising the turbine blade according to claim 1.

17. A gas turbine comprising the turbine blade according to claim 2.

18. A gas turbine comprising the turbine blade according to claim 3.

* * * * *